E. L. AIKEN.
DUST CAP FOR VALVE STEMS.
APPLICATION FILED NOV. 24, 1913.

1,123,157.

Patented Dec. 29, 1914.

Witnesses:
Thomas J. Byrne
Hugo B. Olson

Edward L. Aiken, Inventor
By his Attorneys
Kerr, Page, Cooper & Hayward.

UNITED STATES PATENT OFFICE.

EDWARD LINCOLN AIKEN, OF SPRINGFIELD, MASSACHUSETTS.

DUST-CAP FOR VALVE-STEMS.

1,123,157.      Specification of Letters Patent.      Patented Dec. 29, 1914.

Application filed November 24, 1913. Serial No. 802,624.

*To all whom it may concern:*

Be it known that I, EDWARD L. AIKEN, a citizen of the United States, residing at Springfield, in the county of Hampden and State of Massachusetts, have invented certain new and useful Improvements in Dust-Caps for Valve-Stems, of which the following is a full, clear, and exact description.

It is customary in automobiles, bicycles and the like to carry the tire valve stem through the felly of the wheel and to use, in connection therewith, a washer and a dust cap to secure the valve in place and protect it from weather and dirt and from blows to which it would otherwise be subjected. In the usual forms of appliance of this character, both the washer and the dust cap are secured to the valve steam by screw threads, and the operation of attaching and removing the same is, in consequence, a slow and somewhat inconvenient one.

The invention, subject of this application, is an improvement in such devices designed to hold the valve securely in place and protect it from injury, but which may be applied and removed at once with scarcely any manipulation, although in use it will not shake loose or become unfastened, as the ordinary dust caps are liable to do.

To this end the invention consists of a washer corresponding to that of the ordinary device which surrounds the projecting valve stem, in combination with a dust cap containing a threaded collapsible sleeve which is contracted around the threaded valve stem by forcing the dust cap down over a projecting portion of the washer or valve and locking the same thereto by turning the same, to tighten the threads or by means of some special form of locking device, the contraction of the threaded sleeve being effected by contact with a tapered inner surface in the projecting portion of the washer.

Figure 1:
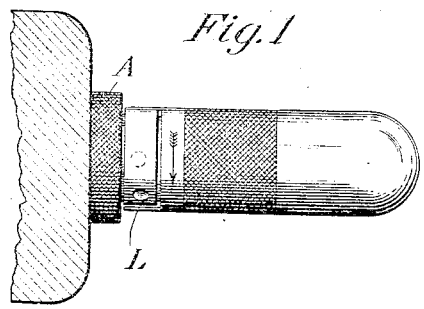
Figure 2:
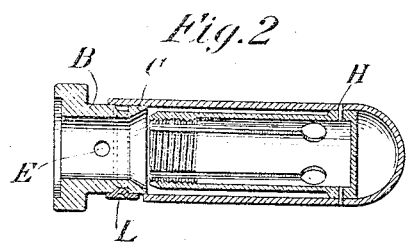
Figure 3:
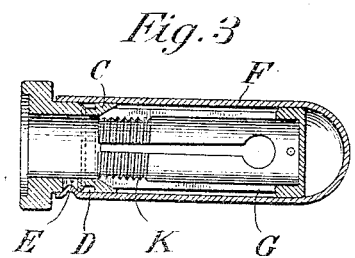

The specific details of this construction may be greatly varied, but in the accompanying drawings I have shown the improvement in the most practical form of which I am aware:

Figure 1 is a view in elevation of the improved dust cap attached in condition of use. Fig. 2 is a longitudinal section of the dust cap and washer before application, and Fig. 3 a similar view of the same parts, in condition of use. A, in the drawing, represents the part corresponding to the ordinary washer. This part contains a recess on its under side to fit over a projection on the felly of the wheel, and comprises a cylindrical portion B with a flange. The inner surface of the cylindrical portion is beveled or tapered at C, and around the outer surface is cut a groove D, between which and the flange is a perforation E. The dust cap F is of the usual configuration and contains a split-cylinder or sleeve G, secured in the cap in any suitable manner, as by steel pins H. The interior of the forward end of the cylinder or sleeve is screw threaded at K, and the cap is formed or provided with a split portion containing a lug L which normally engages the groove D.

In using this device, the washer portion and dust cap are passed over the projecting valve stem and the dust cap forced down to drive the split sleeve or cylinder G into the tapered portion of the nut. This causes the sleeve to clamp the valve stem and, if necessary, the dust cap may be given a few turns to tighten it. The cap is then turned until the lug L engages with the perforation E, which holds the device securely in position. The projection or lug L may readily be formed so that it may not be withdrawn from engagement with the perforation E, except by turning the dust cap in the direction of the arrow for the purpose of removing the same.

By means of this construction the user of the device is enabled to instantly remove the valve or dust cap and the washer instead of unscrewing each separately, as heretofore. The device is simple and not liable to injury or wear and is exceedingly cheap and effective.

What I claim is:

1. A dust cap for valve stems comprising, in combination, a washer for surrounding the valve stem, a dust cap having a threaded collapsible sleeve secured therein, which, by the union of the cap and washer, is forced into engagement with the valve stem by the configuration of the washer.

2. A dust cap for valve stems, comprising, in combination, a washer for surrounding the valve stem and having an interior tapered portion, a dust cap containing a collapsible threaded sleeve united thereto and which is forced by the tapered portion of the washer into engagement with the valve stem by the union of the washer and dust cap, and means for locking the dust cap to the washer.

3. A dust cap for valve stems, comprising, in combination, a washer for surrounding the valve stem, and having an interior tapered portion, a dust cap containing a collapsible threaded sleeve united thereto, which is forced into engagement with the valve stem by the tapered portion of the washer when the dust cap and washer are brought together, the said washer being provided with a groove and the dust cap with a projection by the engagement of which the two are locked together.

4. A dust cap for valve stems, comprising, in combination, a washer having an interior tapered portion, a dust cap containing a threaded sleeve collapsed by the union of the washer and cap, and means for locking the washer and sleeve together, as set forth.

5. The washer having an inner tapered portion, in combination with the dust cap containing a collapsible threaded sleeve and a means for locking the washer and cap together, as set forth.

6. The washer having an interior tapered portion and a recess, in combination with a dust cap containing a collapsible sleeve and a lug or projection for engaging with the recess, to hold the nut and cap together and contract the sleeve over a valve stem, as set forth.

7. A washer having an interior tapered portion, a groove around the outside and a recess or perforation, in combination with a dust cap containing a split and threaded sleeve, and a projection for engaging with the groove and the perforation in the lock nut, to hold the nut and cap together and contract the sleeve over a valve stem, as set forth.

8. A washer having an interior tapered portion, a groove around the outside and a recess or perforation, in combination with a dust cap containing a split and threaded sleeve, and a split portion containing a lug or projection for engaging with the groove and perforation in the nut, as and for the purposes set forth.

In testimony whereof I affix my signature in the presence of two subscribing witnesses.

EDWARD LINCOLN AIKEN.

Witnesses:
   E. Geo. Moseley,
   G. L. Drolette.